(12) United States Patent
Guo

(10) Patent No.: US 6,454,406 B1
(45) Date of Patent: Sep. 24, 2002

(54) ADJUSTABLE TEMPLE MOUNTING ARRANGEMENT

(76) Inventor: Pao-Shoei Guo, No. 19, Alley 2, Lane 279, Chungcheng Road, Yungkang, Tainan (TW)

( * ) Notice: Subject to any disclaimer, the term of this patent is extended or adjusted under 35 U.S.C. 154(b) by 0 days.

(21) Appl. No.: 10/098,106

(22) Filed: Mar. 12, 2002

(51) Int. Cl.⁷ .................................................. G02C 5/14
(52) U.S. Cl. ...................................... 351/120; 351/119
(58) Field of Search ................................. 351/120, 119, 351/118, 116, 111, 41

(56) References Cited

U.S. PATENT DOCUMENTS 6,332,681 B1 * 12/2001 Li ............................... 351/120

* cited by examiner

Primary Examiner—Hung Xuan Dang
(74) Attorney, Agent, or Firm—Pro-Techtor International Services

(57) ABSTRACT

An adjustable temple mounting arrangement is constructed to include a rim holding a glass lens, a flexible coupling block pivoted to the rim, the coupling block having a rear receiving open chamber, a pivot hole in communication with the rear receiving open chamber at one side, and a plurality of retaining grooves disposed in a smoothly arched inside wall thereof in an inner side of the receiving open chamber, and a temple, the temple having a front butt-strap inserted into the receiving open chamber of the coupling block, the butt-strap having a short pivot rod pivoted to the pivot hole of the coupling block, and a plurality of teeth forwardly extended from a convex front end thereof and forced into engagement with the retaining grooves of the coupling block.

1 Claim, 4 Drawing Sheets

US 6,454,406 B1

ADJUSTABLE TEMPLE MOUNTING ARRANGEMENT

BACKGROUND OF THE INVENTION

1. Field of the Invention

The present invention relates to eyeglasses and, more particularly, to an adjustable temple mounting arrangement for eyeglasses, which is easy and inexpensive to manufacture and, enables the user to adjust the angular position of the temple conveniently.

2. Description of the Related Art

A variety of eyeglasses have been developed for different purposes, for example, for protecting the eyes against the radiation of the sun or fire or correcting the visual power of the eyes. The temples of regular eyeglasses are not adjustable. When not fit the desired angle, the temples must be properly deformed. There are also known eyeglasses with adjustable temples that enable the user to adjust the angular position of the temples for a comfortable wearing. FIG. 1 is an exploded view of an adjustable temple mounting structure for eyeglasses according to the prior art. According to this design, the rim 100 has a locating hole 101 in the endpiece thereof for the positioning of a mounting block 200. The mounting block 200 has a coupling hole 201 extended through the rear side thereof and a plurality of retaining grooves 202 inside the coupling hole 201. The temple 300 has a front coupling end 301 coupled to a coupling block 302, which is coupled to the mounting block 200 through a connecting bar 400. The coupling block 302 has two front lugs 303 pivoted to the rear end 401 of the connecting bar 400. The connecting bar 400 is inserted into the coupling hole 201 of the mounting block 200, having a front tooth 402 forced into engagement with the retaining grooves 202 of the mounting block 200. When adjusting the angular position of the temple 300, turn the temple 300 relative to the rim 100 to shift the engagement of the tooth 402 from one retaining groove 202 to another (see FIG. 2). This design of adjustable temple mounting arrangement is still not satisfactory in function. The drawbacks of this design of adjustable temple mounting arrangement are numerous as follows:

1. Because this design of adjustable temple mounting arrangement is comprised of a number of parts including the rim 100, the mounting block 200, the connecting bar 400, the coupling block 302, and the temple 300, the assembly process is complicated and consumes much labor.
2. Because the rim 100, the mounting block 200, the connecting bar 400, the coupling block 302, and the temple 300 must be separately fabricated with different molds, the manufacturing cost is high.
3. Because the tooth 402 of the connecting bar 400 is obliquely engaged into the retaining grooves 202 of the mounting block 200 when adjusting the angular position of the temple 300, the connecting bar 400 tends to be disengaged from the retaining grooves 202 of the mounting block 200, causing a vibration.
4. Because the mounting block 200 is rigid and not compressible, the tooth 402 tends to break when adjusting the angular position of the temple 300.

SUMMARY OF THE INVENTION

The present invention has been accomplished to provide an adjustable temple mounting arrangement for eyeglasses, which eliminates the aforesaid drawbacks.

It is one object of the present invention to provide an adjustable temple mounting arrangement, which has a simple structure.

It is another object of the present invention to provide an adjustable temple mounting arrangement, which is easy and inexpensive to manufacture.

It is still another object of the present invention to provide an adjustable temple mounting arrangement, which enables the user to conveniently adjust the angular position of the temple.

It is still another object of the present invention to provide an adjustable temple mounting arrangement, which is durable in use.

To achieve these and other objects of the present invention, the adjustable temple mounting arrangement comprises a rim holding a glass lens, a temple, and a flexible coupling block coupled between the rim and the temple for enabling the temple to be adjusted to one of a series of angular positions. The coupling block has a front lug pivoted to the rim, a rear receiving open chamber, a pivot hole in communication with the rear receiving open chamber at one side, and a plurality of retaining grooves disposed in a smoothly arched inside wall thereof in an inner side of the receiving open chamber. The temple has a front butt-strap inserted into the receiving open chamber of the coupling block. The butt-strap comprises a short pivot rod pivoted to the pivot hole of the coupling block, and a plurality of teeth forwardly extended from a convex front end thereof and forced into engagement with the retaining grooves of the coupling block. Further, the coupling block has a transverse slot, which makes the coupling block compressible.

DETAILED DESCRIPTION OF THE PREFERRED EMBODIMENT

Figures 1, 2:
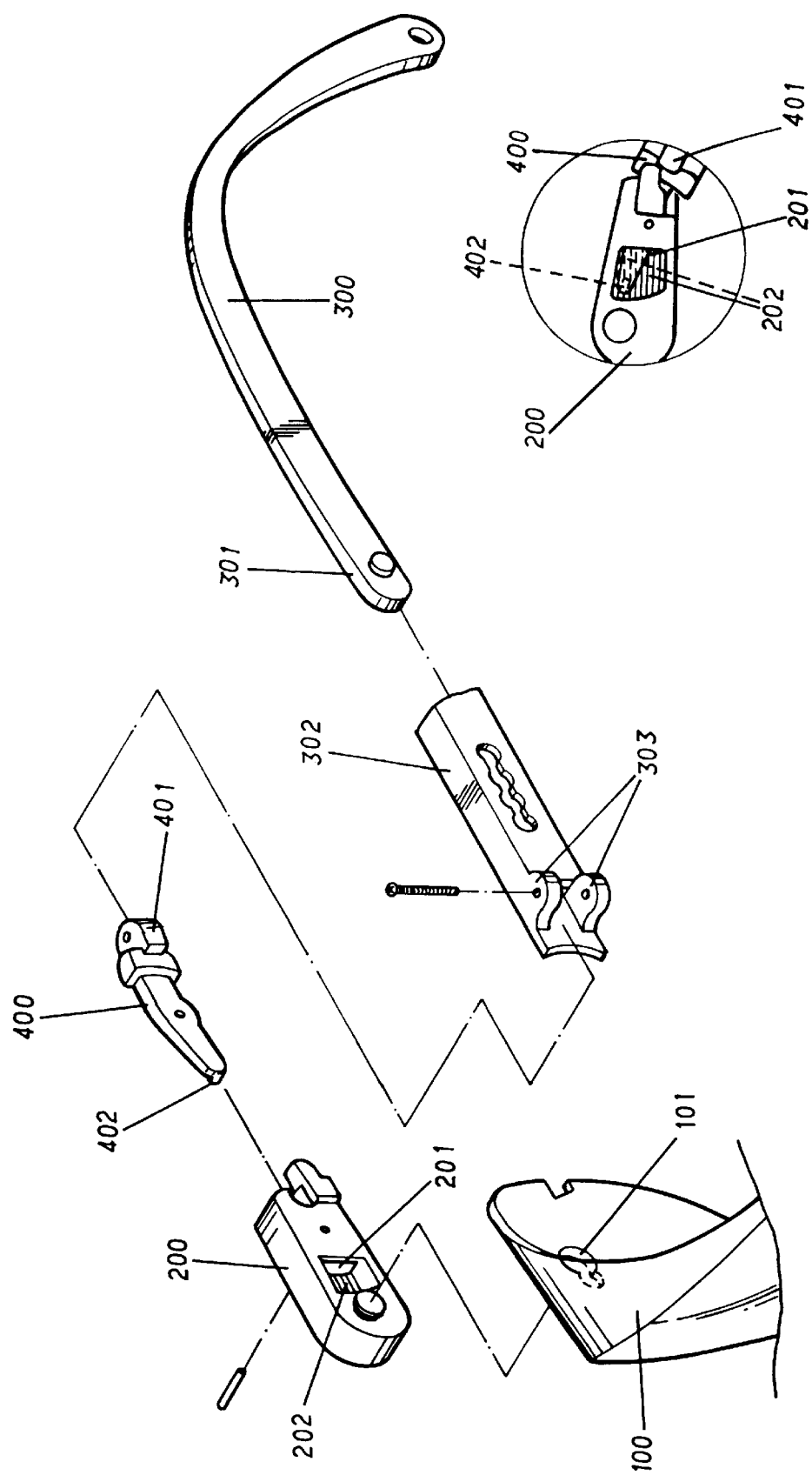
FIG. 1 is an exploded view of an adjustable temple mounting arrangement for eyeglasses according to the prior art.
FIG. 2 is an assembly view of a part of the temple mounting arrangement for eyeglasses according to the prior art.
Figure 3:
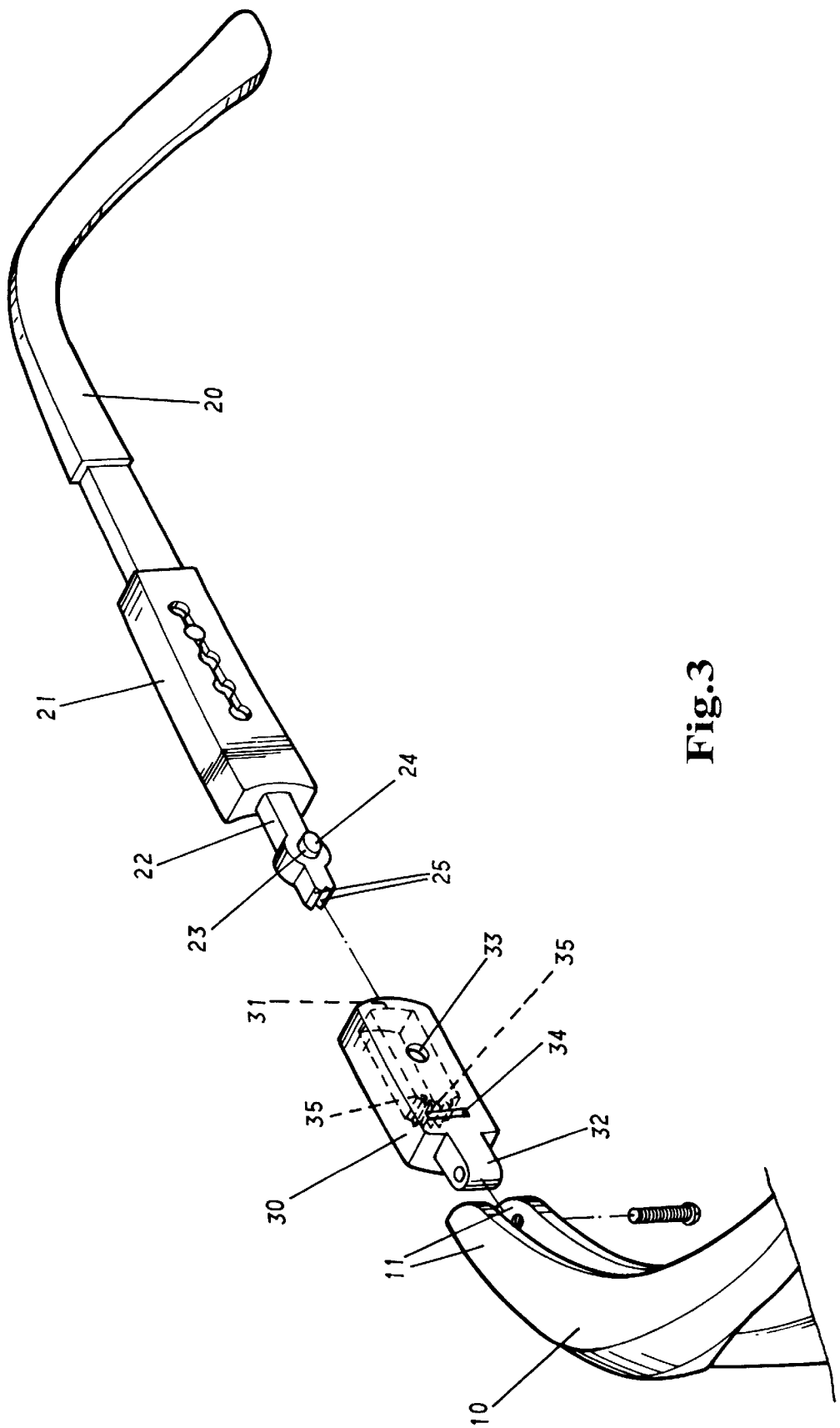
FIG. 3 is a perspective exploded view of an adjustable temple mounting arrangement for eyeglasses according to the present invention.

Referring to FIG. 3, an adjustable temple mounting arrangement in accordance with the present invention is shown comprised of a rim 10 holding a glass lens, a temple 20, and a coupling block 30 coupled between the temple 20 and the rim 10. The rim 10 has an endpiece 11. The temple 20 comprises a butt-strap 22 forwardly extended from the front block 21 thereof for coupling to the coupling block 30. The butt-strap 22 comprises a short pivot rod 23 perpendicularly extended from one lateral side thereof and a plurality of teeth 25 forwardly extended from the convex front end thereof. The short pivot rod 23 has a beveled front end edge 24. The coupling block 30 comprises a receiving open chamber 31 axially extended through the rear side thereof for receiving the butt-strap 22 of the temple 20, a front lug 32 forwardly extended from the front side thereof for pivoting to the endpiece 11 of the rim 10, a pivot hole 33 transversely disposed at an inner side thereof in communication with the receiving open chamber 31, a plurality of retaining grooves 35 disposed in a smoothly arched inside wall thereof in the inner side of the receiving open chamber 31, and a transverse slot 34 spaced between the front lug 32 and the receiving open chamber 31.

Figure 4:
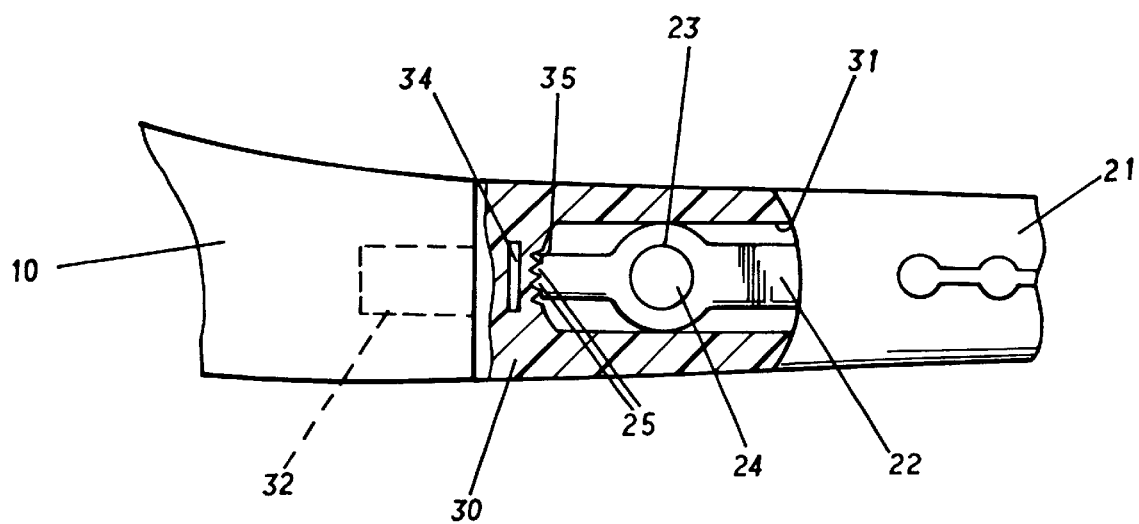
FIG. 4 is a sectional assembly view of a part of the present invention, showing the coupling block coupled between the rim and the temple.
Figure 5:
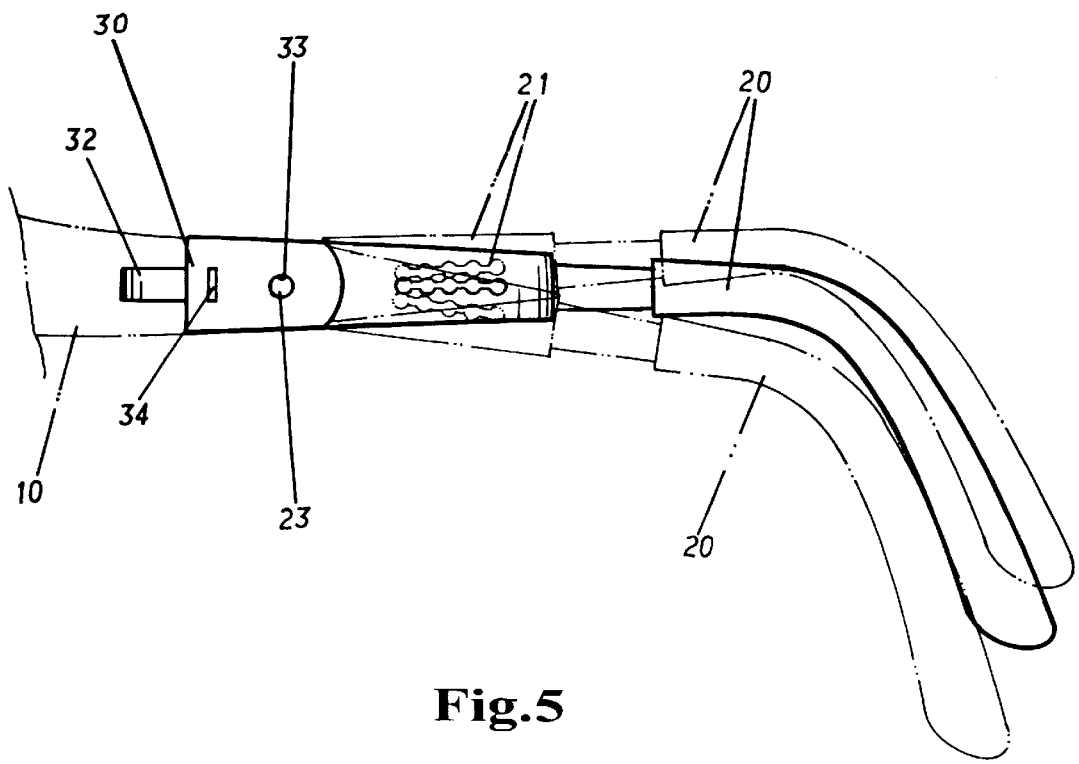
FIG. 5 is a schematic drawing showing the adjustment of the angular position of the temple according to the present invention.

The assembly process of the present invention is outlined hereinafter with reference to FIGS. 4 and 5. The front lug 32 of the coupling block 30 is pivoted to the endpiece 11 of the rim 10. Then, the butt-strap 22 of the temple 20 is inserted into the receiving open chamber 31 of the coupling block 30 to force the short pivot rod 23 of the butt-strap 22 into the pivot hole 33 of the coupling block 30 and the teeth 25 of the butt-strap 22 into the retaining grooves 35. By means of the beveled front end edge 24, the short pivot rod 23 can smoothly be guided into the pivot hole 33.

Figure 6:
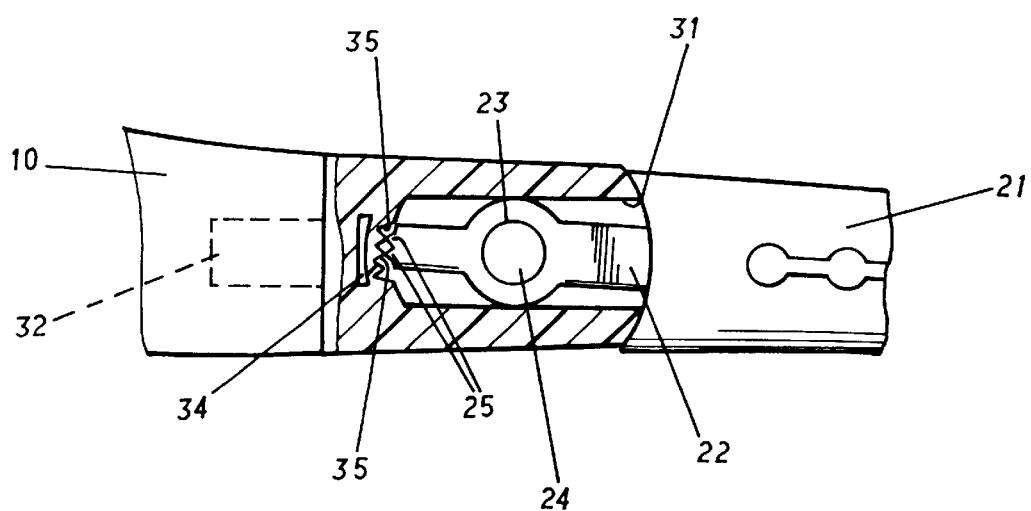
FIG. 6 is similar to FIG. 4 but showing the angular position of the temple adjusted.

Referring to FIG. 6 and FIG. 5 again, after the eyeglasses has been put on the head over the eyes, the user can turn the temple 20 relative to the coupling block 30 and the rim 10 to shift the engagement between the teeth 25 of the temple 20 and the retaining grooves 35 of the coupling block 30, enabling the temple 20 to be adjusted to the desired angular position. The transverse slot 34 enables the coupling block 30 to be compressed when adjusting the angular position of the temple 20. After adjustment, the teeth 25 are maintained positively engaged with the retaining grooves 35, holding the temple 20 in the adjusted angular position.

A prototype of adjustable temple mounting arrangement has been constructed with the features of FIGS. 3~6. The adjustable temple mounting arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable temple mounting arrangement comprising a rim holding a glass lens, a temple, and a coupling block coupled between said temple and said rim;

wherein said coupling block comprises a receiving open chamber axially extended through a rear side thereof, a front lug forwardly extended from a front side thereof and pivoted to said rim, a pivot hole transversely disposed at an inner side thereof in communication with said receiving open chamber, a plurality of retaining grooves disposed in a smoothly arched inside wall thereof in an inner side of said receiving open chamber, and a transverse slot spaced between said front lug and said receiving open chamber for making said coupling block compressible;

said temple comprises a butt-strap forwardly extended from a front block thereof and inserted into the receiving open chamber of said coupling block, said butt-strap comprising a short pivot rod perpendicularly extended from one lateral side thereof and pivoted to the pivot hole of said coupling block, and a plurality of teeth forwardly extended from a convex front end thereof and forced into engagement with the retaining grooves of said coupling block.

* * * * *